Nov. 8, 1966  K. MATTERN  3,284,067

LIQUID DISTRIBUTION APPARATUS

Filed Oct. 5, 1964  3 Sheets-Sheet 2

Inventor
KONRAD MATTERN,

BY Bailey, Stephens & Huettig
ATTORNEYS

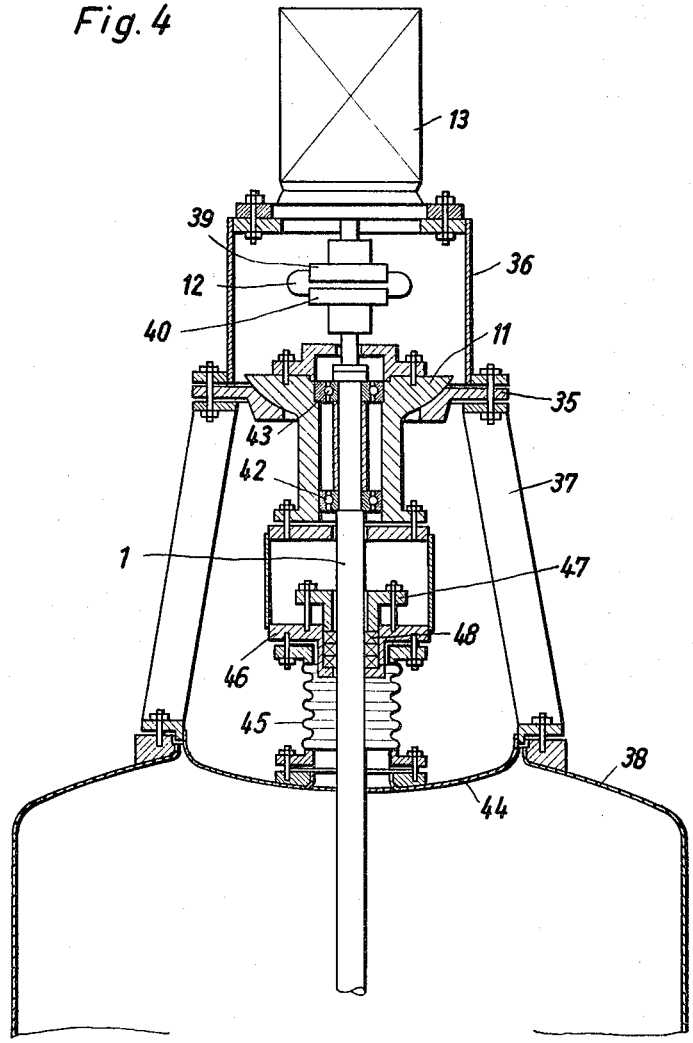

3,284,067
LIQUID DISTRIBUTION APPARATUS
Konrad Mattern, Bad Homburg vor der Hohe, Germany, assignor to Metallgesellschaft Aktiengesellschaft, Frankfurt am Main, Germany
Filed Oct. 5, 1964, Ser. No. 401,492
Claims priority, application Germany, Oct. 8, 1963, M 58,459
4 Claims. (Cl. 261—84)

This invention relates to an apparatus for distributing liquids in a gas or vapor providing a means for controlling oscillation or vibration of a rotating shaft which is part of the apparatus.

It is known to distribute liquids in gases or vapors in scrubbers, distillation columns and other apparatus in finely divided form with the aid of rotating distributors. However, the use of such rotating distributors involves difficulties, particularly in large apparatus, because oscillation or vibration tends to occur in the shafts which the bearings cannot control.

The present invention provides an apparatus for distributing a liquid in a gas or vapor, wherein rotatable distributor means are attached to a common rotatable shaft, which is freely and pendantly suspended within a casing, and wherein movable bearings are provided for guiding the shaft and are yieldingly supported from the casing by shock absorbing elements between the bearings and the casing.

In this arrangement, the shaft, which is preferably vertical, and upon which one or more distributing means, such as plates, discs, segments or cylinders, are mounted, is freely suspended pendantly from a point near a free flexible coupling through which the drive is transmitted. The shaft is held in the casing in one or more movable bearings according to the size of the apparatus yieldingly supported from fixed points, for instance, on the casing wall. Moreover, the movable bearings are connected to these or other fixed points by interposed shock absorbers. These suspension means position the freely suspended shaft in such a manner that when the shaft rotates it still can oscillate or move like a pendulum and deflections due to imbalance are resiliently absorbed. Deflecting forces are taken up and absorbed by the shock absorbers which prevent the shaft from building up oscillation or vibrations. The pendant assembly behaves like a gyro when the critical speed of revolution is exceeded. The only remaining function performed by the bearings is prevention of gradual migration of the gyro into a different axial position.

The invention is described hereinafter by the accompanying drawings which illustrate diagrammatically and by way of example an embodiment thereof, and in which:

FIGURE 4 is a vertical section in more detail of the upper end of the apparatus of FIGURE 1.

Figure 1:
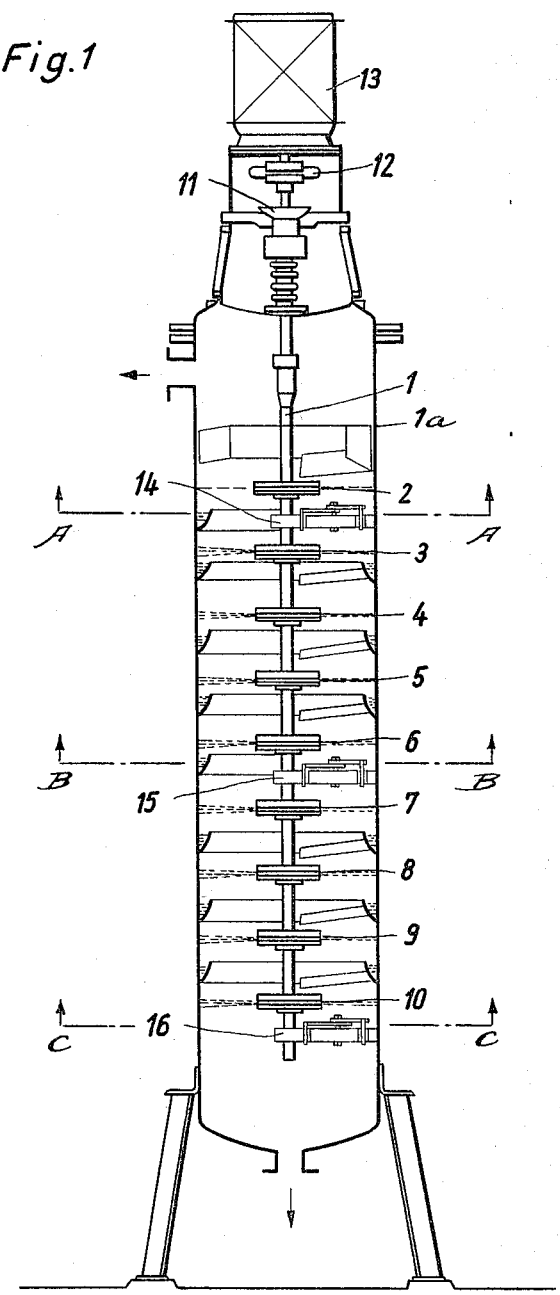
FIGURE 1 is a fragmentary vertical section of an apparatus for distributing a liquid in a gas according to the invention.
Figure 2:
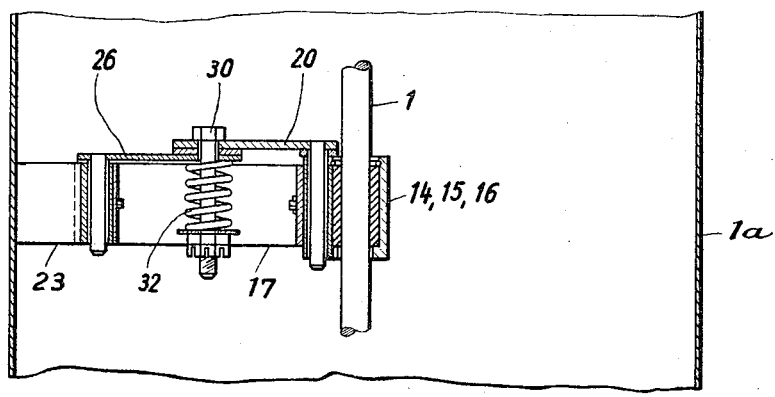
FIGURE 2 is a fragmentary more detailed vertical section, on an enlarged scale, of part of the apparatus shown in FIGURE 1.
Figure 3:
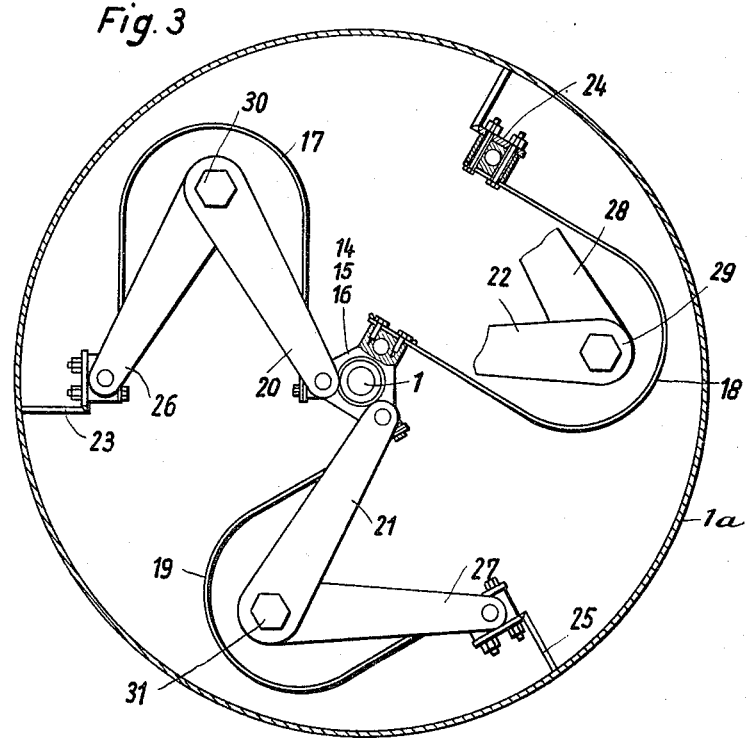
FIGURE 3 is a partial plan view and cross-section of the part shown in FIGURE 2 and taken on A—A, B—B or C—C of FIGURE 1.

Referring to the drawings, the apparatus for distributing a liquid in a gas comprises a cylindrical casing 1a within which a shaft 1 carrying atomizing discs 2, 3, 4, 5, 6, 7, 8, 9, and 10 is suspended in the center of the casing 1a from a supporting bearing member 11 such that the shaft can move or rotate freely. The shaft 1 is driven by motor 13 through a flexible coupling 12 and is maintained in a vertical position by bearings 14, 15 and 16. The bearings 14, 15 and 16 are connected to the wall of the casing by oscillation or vibration absorbing means provided by U-springs 17, 18 and 19 shown in FIGURE 3 which seek to retain the bearings in a position in which the center axis of the bearings coincides with the center axis of the cylindrical casing. Primary lever arms 20, 21 and 22 are pivotally connected to the bearing 14, and secondary lever arms 26, 27 and 28 are pivotally connected to brackets 23, 24 and 25 rigidly connected to the casing. Each pair of lever arms 20 and 26, 21 and 27, and 22 and 28 are pivotally interconnected like a hinge by bolts 29, 30 and 31 and coil springs such as coil spring 32 in such a way that the friction originating or created in the hinge offers a well-defined resistance to movement of the shaft 1 from the center position. Each of bearings 14, 15 and 16 are connected to the casing by brackets, lever arms, and U-springs like those shown in FIGURES 2 and 3.

Referring particularly to FIGURE 4, brackets 37 are affixed to the head 38 of the cylindrical casing and support an annular bearing seat 35 having a concave socket for the bearing member 11. The brackets 37 also support housing 36. The driving motor 13 is mounted on housing 36 so that it is axially aligned with the cylindrical casing. The lower end of the motor shaft and the upper end of shaft 1 carry coupling sections 39 and 40, the two halves being interconnected by a flexible bellows coupling element 12. The shaft 1 is rotatably mounted in bearing member 11 by bearings 42 and 43. The bearing member 11 has an annular flange with a convex lower face which rests in the concave socket of bearing seat 35. The common center axis of the convex face of flange 11 and of the concave socket of bearing seat 35 are aligned with the center of the driving coupling comprising parts 39, 40 and 12. As a result, the shaft 1 can both rotate and swing or move like a pendulum without changing the center position of the coupling comprising parts 39, 40 and 12. The revolving shaft 1 passes into the interior of the casing through a central opening in removable part 44 of the casing. A flexible seal between the revolving shaft 1 and the casing is formed by a flexible bellows 45, a stuffing box 46, a gland 47 and packing 48. The body of the stuffing box 46 to which the gland 47 and the top of the bellows are affixed is secured to the bearing body 11.

During operation of the described arrangement, a liquid is finely divided by the atomizing discs 2–10. The droplets of liquid impinging upon the casing wall trickle down the wall for instance into collecting troughs which deliver them to the next atomizing disc below.

I claim:
1. An apparatus for distributing a liquid in a gas or vapor comprising in combination a rotatable shaft having liquid distributor means attached thereto, a casing surrounding the shaft and distributor means, a bearing shaft suspension means whereby the shaft is rotatably mounted on said bearing which permits the shaft to both rotate and swing like a pendulum, shaft centering means comprising bearings which are yieldingly connected to the casing and shaft through shock absorbing means.

2. An apparatus as in claim 1 wherein the shaft suspension means comprises a bearing having a seat with a concave bearing face and a cooperating bearing member having a convex face.

3. An apparatus as in claim 1 wherein the shaft suspension means comprises a bearing having a seat with a concave bearing face and a cooperating bearing member having a convex face, also comprising bearings surrounding the shaft whereby the shaft is held in said shaft suspension means.

4. An apparatus for distributing a liquid in a gas or vapor comprising in combination a rotatable shaft having liquid distribution means attached thereto, a casing surrounding the shaft and distributor means, shaft suspension means comprising a bearing having a seat with a concave bearing face and a cooperating bearing member having a convex face, shaft rotating means connected to the shaft by means of a flexible coupling, and means rotatably and flexibly sealing and connecting the shaft to the casing and through which the shaft passes into the casing comprising a flexible bellows coupling and packing.

References Cited by the Examiner

UNITED STATES PATENTS

| | | |
|---|---|---|
| 1,345,506 | 7/1920 | Hovland. |
| 2,040,351 | 5/1936 | Williams _____ 308—143 |
| 2,699,225 | 1/1955 | Dahlbeck _____ 261—84 X |

HARRY B. THORNTON, *Primary Examiner.*

RONALD R. WEAVER, *Examiner.*